United States Patent
Albert

(10) Patent No.: US 11,612,953 B2
(45) Date of Patent: Mar. 28, 2023

(54) METHOD FOR REDUCING OR COMPLETELY CLOSING AN OPENING OF AN INNER CONTOUR OF A WORKPIECE BY MEANS OF A MATERIAL MELTED BY A LASER DEPOSITION WELDING DEVICE

(71) Applicant: SAUER GmbH, Stipshausen (DE)

(72) Inventor: David Albert, Stöttwang (DE)

(73) Assignee: SAUER GmbH, Stipshausen (DE)

( * ) Notice: Subject to any disclaimer, the term of this patent is extended or adjusted under 35 U.S.C. 154(b) by 918 days.

(21) Appl. No.: 16/476,147

(22) PCT Filed: Jan. 10, 2018

(86) PCT No.: PCT/EP2018/050563
§ 371 (c)(1),
(2) Date: Jul. 5, 2019

(87) PCT Pub. No.: WO2018/130571
PCT Pub. Date: Jul. 19, 2018

(65) Prior Publication Data
US 2019/0344382 A1    Nov. 14, 2019

(30) Foreign Application Priority Data
Jan. 10, 2017   (DE) .................... 10 2017 200 233.6

(51) Int. Cl.
*B23K 26/00*    (2014.01)
*B23K 26/342*    (2014.01)
(Continued)

(52) U.S. Cl.
CPC ........ *B23K 26/0006* (2013.01); *B23K 26/342* (2015.10); *B23K 35/0244* (2013.01);
(Continued)

(58) Field of Classification Search
CPC ............ B23K 26/34–342; B33Y 10/00; B33Y 30/00; B33Y 50/00
See application file for complete search history.

(56) References Cited

U.S. PATENT DOCUMENTS

| 2007/0203584 A1 | 8/2007 | Bandyopadhyay et al. |
| 2013/0195671 A1* | 8/2013 | El-Wardany ............ C23C 14/28 427/299 |
| 2016/0074937 A1 | 3/2016 | Nassar et al. |

FOREIGN PATENT DOCUMENTS

| CN | 101114719 A | 1/2008 |
| CN | 101593631 A | 12/2009 |

(Continued)

OTHER PUBLICATIONS

English translation of WO 2004022266 (Year: 2004).*
(Continued)

*Primary Examiner* — Erin E McGrath
(74) *Attorney, Agent, or Firm* — Henricks Slavin LLP

(57) ABSTRACT

The present invention relates to a method for reducing or completely closing an opening of an inner contour 2 of a workpiece by means of a material melted by a laser deposition welding device 7, comprising the following steps: providing a workpiece 1 with an inner contour 2 having an opening defined by an edge section 11, forming a plurality of base webs 41 from molten material by laser deposition welding by starting at the edge section 11 of the inner contour 2 of the workpiece in such a way that the formed base webs 41 protrude from the edge section 11 at a predetermined angle, connecting adjacent base webs 41 by forming connecting webs 42 from molten material by laser deposition welding in such a way that a support structure 4 which comprises base webs 41 and connecting webs 42 is formed, forming a cover layer 5 of molten material connected to the support structure 4 in such a way that the
(Continued)

opening of the inner contour 2 is reduced or completely closed.

22 Claims, 7 Drawing Sheets

(51) Int. Cl.
  *B23K 101/24* (2006.01)
  *B23K 101/06* (2006.01)
  *B23K 101/28* (2006.01)
  *B23K 35/02* (2006.01)

(52) U.S. Cl.
  CPC ...... *B23K 2101/06* (2018.08); *B23K 2101/24* (2018.08); *B23K 2101/28* (2018.08)

(56) References Cited

FOREIGN PATENT DOCUMENTS

| CN | 103978206 A | 8/2014 |
|---|---|---|
| CN | 204235893 U | 4/2015 |
| CN | 105452981 A | 3/2016 |
| CN | 106132654 A | 11/2016 |
| DE | 19903436 A1 | 8/2000 |
| DE | 102004043746 A1 | 3/2006 |
| EP | 1721696 A1 | 5/2006 |
| EP | 2842677 A1 | 3/2015 |
| JP | 04-169222 A | 6/1992 |
| JP | 06-68343 A | 1/1994 |
| JP | 2013-158796 A | 8/2013 |
| JP | 2016-002565 A | 1/2016 |
| WO | WO 2004/022266 A1 | 3/2004 |

OTHER PUBLICATIONS

English translation of JP 2013158796 (Year: 2013).*
International Search Report dated Jul. 10, 2018 for PCT App. Ser. No. PCT/EP2018/050563.
Office Action dated Dec. 28, 2021, with English translation, for corresponding Japanese App. Ser. No. 2019-537311.
Office Action dated Dec. 16, 2020, with English translation, for corresponding Korean App. Ser. No. 10-2019-7019884.
Office Action dated Dec. 10, 2020 for corresponding Chinese App. Ser. No. 201880006429.8.
Office Action dated Oct. 5, 2020, with English translation, for corresponding Korean App. Ser. No. 10-2019-7019884.

* cited by examiner

METHOD FOR REDUCING OR COMPLETELY CLOSING AN OPENING OF AN INNER CONTOUR OF A WORKPIECE BY MEANS OF A MATERIAL MELTED BY A LASER DEPOSITION WELDING DEVICE

The present invention relates to a method for reducing or completely closing an opening of an inner contour of a workpiece by means of a material melted by a laser deposition welding device according to the preamble of claim 1 and a method for projecting an outer contour of a workpiece by means of a material melted by a laser deposition welding device according to the preamble of claim 2.

BACKGROUND OF THE INVENTION

In the area of additive manufacturing of individual layers up to the production of 3D structures, inter alia laser powder deposition welding is used, which belongs to the production processes of deposition welding (or also called cladding). The surface of the workpiece is melted using local heat while at the same time almost any metallic material is applied in powder form. Nowadays, a high-performance diode laser or fiber laser is primarily used as a heat source.

The formation of overhanging or self-support structures is a particular problem in deposition welding, in particular in cases in which it is not possible to use an auxiliary structure on which the metallic material can be welded and which can be removed at a later date.

In most cases, the aim is to design the contour of a component in such a way that it can be moved around several spatial directions during the deposition welding process so that excessive overhangs can be avoided when material is applied. However, this procedure is quickly limited if, for example, there is a risk of collision between the component and the laser deposition welding device due to movement of the component during the process.

If, however, an attempt is made to form more extensive overhangs, the laser deposition welding processes known to date are only suitable to a limited extent, since in the known processes the molten material runs or drips off from the location where the material shall be applied. This leads to low quality production results or a high reject rate of the parts produced in this way, so that these processes are unsuitable for these tasks from a technological and economic point of view.

SUMMARY OF THE INVENTION

One object of the present invention is therefore to provide a method for reducing or completely closing an opening of an inner contour of a workpiece by means of a material melted by a laser deposition welding device, by means of which the above problems are avoided.

Furthermore, an object of the present invention is to provide a method for projecting an outer contour of a workpiece by means of a material melted by a laser deposition welding device, by means of which the above problems are also avoided.

These objects are achieved by a method according to claim 1 or by a method according to claim 2. The dependent claims refer in each case to advantageous embodiments of the method according to the invention.

The method according to the invention for reducing or completely closing an opening in an inner contour of a workpiece by means of a material melted by a laser deposition welding device includes the following steps: providing a workpiece with an inner contour having an opening defined by an edge section, forming a plurality of base webs from molten material by laser deposition welding by starting at the edge section of the inner contour of the workpiece such that the formed base webs protrude from the edge section at a predetermined angle, joining adjacent base webs by forming connecting webs from molten material by means of laser deposition welding in such a way that a support structure comprising base webs and connecting webs is formed, forming a cover layer which is made of molten material and is connected to the support structure in such a way that the opening of the inner contour is reduced or completely closed.

By constructing the support structure, it is possible to close even large opening areas by means of the laser deposition welding process. The stepwise construction of the support structure makes it possible to build a self-supporting/overhanging structure step by step, which can then either close an opening or be used to apply an additional layer of molten material to the support structure, thereby closing the opening.

The support structure is constructed stepwise by applying individual molten material dots, which are all cooled after their application onto an already existing structure (workpiece or already applied material). This rapid cooling of the still liquid metal leads to a comparatively rapid solidification of the material just applied. Thus, the shape of the material just applied can be roughly kept, so that a comparatively precise design is possible.

In order to cool the molten material dots, further metal powder is preferably fed onto the material melt, where it bonds with the melt and forms a top layer. This top layer can later be advantageously used to apply further molten material, the liquefied material bonding particularly quickly and effectively with the top layer. In addition, the material melt is cooled by the transport gas of the metal powder, which, as the transport medium of the material, is forcibly conveyed together with the material to be melted to a location to be processed.

In first tests of this method, the inventors were surprised to discover that in some cases considerable lengths of self-supporting elements, such as the base webs, can be produced. Lengths of up to a few centimeters could be achieved without the webs deforming excessively (e.g. due to gravity, etc.) and without an auxiliary structure having to be used.

On this basis, large openings can be closed in some cases and the material used can be kept to a manageable amount. In addition, considerably less reworking of the applied layer was necessary, which means that machine times can be reduced when this method is used in series at a later date.

The method according to the invention for projecting an outer contour of a workpiece by means of a material melted by a laser deposition welding device includes the following steps: providing a workpiece having an outer contour defined by an edge section, forming a plurality of base webs of molten material by laser deposition welding by starting at the edge section of the outer contour of a workpiece such that the formed base webs protrude from the edge section at a predetermined angle, connecting adjacent base webs by forming connecting webs of molten material by means of laser deposition welding in such a way that a support structure comprising base webs and connecting webs is formed, forming a projecting layer which is made of molten material and is connected to the support structure in such a way that the outer contour of the workpiece is projected.

As with the method for reducing or completely closing an opening in an inner contour of a workpiece, the advantages already mentioned are also achieved when a projection layer is formed. In addition, it is of course advantageous that also only parts of an outer or inner contour can be further formed using this method.

This is particularly advantageous when smaller (partial) projections can be applied to an existing workpiece in an optimized manner in terms of time and cost, instead of using subtractive manufacturing processes, such as milling, to machine significantly larger main bodies so that the component to be produced has a projecting section.

Furthermore, these methods can be used to add freely shapeable sections in well-calculated fashion to already existing components by welding, which makes relatively complex designs possible while at the same time ensuring appropriate use of materials and production time.

An advantageous development of the methods according to the invention consists in that the cover layer or projection layer is formed by filling free spaces of the support structure with molten material.

This allows that the support structure itself can be further developed as a cover layer or projection layer. As a result, the free spaces of the support structure, which is primarily grid-shaped, can be filled with further molten material.

An advantageous development of the methods according to the invention consists in that the cover layer or projection layer is formed by applying an additional layer of molten material to the support structure.

Furthermore, the support structure can be used as an auxiliary structure on which an additional layer of molten material is applied. This is particularly advantageous when large areas have to be spanned or projected and the support layer provides additional stability as a kind of substructure. The grid-shaped structure of the support structure is particularly suitable for this purpose since it allows a combination of high stability with comparatively low dead weight.

A particularly advantageous development of the methods according to the invention is that the base webs and/or the connecting webs of the support structure are formed by dot-wise application of molten material according to the following steps: supplying the material to be melted by means of a material supply apparatus to a predetermined location of the workpiece or to a predetermined location of the already applied material, switching on and directing a laser beam of the laser deposition welding device to the predetermined location so that the material to be melted is melted and deposited by the laser beam at the predetermined location, switching off the laser beam after exceeding a predetermined laser time, further supplying material to be melted to the predetermined location for a period of a predetermined cooling time.

A particularly advantageous method for forming the support structure is the dot-wise construction of the base and connecting webs. Individual material dots are here melted and applied to an existing structure in order to cool the material melt afterwards by means of further metal powder and/or the transport gas of the metal powder and thus solidify it in its form as well as locally.

This makes it possible to secure the support structure relatively precisely in position during its construction and to shape it as required for use. Deformation of the produced structure can be largely prevented because the material dots are in a liquid state while applied and naturally tend to shift in the direction of the acting gravity.

An advantageous development of the methods according to the invention consists in that a plurality of the base webs and a plurality of the connecting webs are arranged in such a way that the connecting webs each connect the adjacent base webs with one another and that the base webs and the connecting webs together form a grid-like structure.

The methods are not limited to cylindrical workpieces or generally to enclosed structures. On the contrary, the methods according to the invention can be advantageously developed by arranging the base webs for reducing or completely closing a trench-shaped or longitudinal opening of the inner contour of a workpiece in such a way that they extend from the edge section substantially width-wise regarding the trench-shaped or longitudinal opening, and the connecting webs are arranged in a row in such a way that the connecting webs are arranged substantially parallel to the edge section of the trench-shaped or longitudinal opening.

This makes it possible to completely or partially span longitudinal openings (e.g. one longitudinal side of a cooling duct) with a support structure which can be subsequently either developed as a cover layer or a separate cover layer can be applied thereto in order to reduce or completely close the longitudinal opening.

In addition, the methods according to the invention can be further developed in an advantageous way when the base webs and connecting webs together form a spiderweb-like structure, a checkered structure or a honeycombed structure.

In most cases, the support structure forms the starting position on which the development can continue. Depending on the use case, it makes sense to use different grid shapes to design the support structure according to the use. The formation of spiderweb-like, checkered or honeycombed structures is only one example of possible structures. The method is in no way limited to the described or named forms but can also be composed of completely freely designed forms and cross-links as well as combinations of known structural patterns.

In addition, the methods according to the invention can be advantageously developed when the laser beam has a diameter of 1 mm to 5 mm, preferably 2 mm to 4 mm and more preferably 2.5 mm to 3.5 mm.

In addition, the methods according to the invention can be developed advantageously when the laser time is between 0.2 and 2 seconds, preferably between 0.5 and 1.5 seconds, and more preferably 1 second.

This allows the applied structures of the molten material can be built up relatively thin and filigree in some cases, but also with greater material thickness in other cases. In most cases, this can take place in a single pass so that production time and energy can be saved again.

An advantageous development of the methods according to the invention consists in that, after a dot-wise application of molten material at the predetermined location, the material supply apparatus and the laser beam are displaced in each case by 0.5 mm to 1.8 mm, preferably by 0.8 mm to 1.5 mm and more preferably by 1 mm to 1.2 mm, to the other predetermined location of the applied material during the formation of base webs and/or connecting webs of the support structure in order to apply another material for the respective base web and/or connecting web of the support structure dot-wise.

Depending on the amount of material applied and the laser point diameter, it is thus possible to form base and connecting webs in smaller as well as larger steps. This means that the support structure, like any other structure, can be carried out more precisely and/or in a much shorter time.

In addition, the methods according to the invention can be advantageously developed by the fact that the cooling time is between 1 and 10 seconds, preferably between 3 and 8 seconds, and more preferably between 4 and 6 seconds.

Here, too, the parameters of the cooling process, i.e. correspondingly those of the cooling time, can be adapted to the respective use case. Depending on the requirements, different accuracies and production speeds can thus be achieved and the surface structure of the applied material can thus be influenced.

An advantageous development of the methods according to the invention consists in that the material supply apparatus is arranged to guide the material to be melted to the predetermined locations via a nozzle in a focusing way.

In order to make optimum use of the employed metal powder, it is advisable to direct this powder through a nozzle to the location where the metal powder shall be melted and applied. Furthermore, by focusing the metal powder through the nozzle, a more precise formation of individual sections (such as base and connecting webs) can be ensured. Furthermore, resources can be conserved by this.

The method according to the invention can be developed advantageously by designing the nozzle in such a way that it is set at any angle relative to a surface normal of a workpiece surface to be processed, preferably between −45° and +45° and more preferably between −25° and +25°.

When forming a surface by the method according to the invention, it may sometimes be necessary to set the nozzle at different angles according to the given space conditions and the available working space. In most cases, the nozzle will be positioned perpendicularly to the direction of formation of the surface to be applied. Advantageously, if there is a risk of collision between the nozzle and the workpiece, the angle can now be set from the vertical by any angle, preferably e.g. ±45° or ±25°, in order to avoid a possible collision.

Through the methods according to the invention, additive manufacturing techniques, such as laser powder deposition welding, can be used to form closures of openings and projections, even if these have to be comparatively large in area, without having to resort to an auxiliary structure during the formation of the closures or projections. The advantages of additive manufacturing (e.g. conservation of resources, economic efficiency, etc.) can be used and extended by one decisive point, namely the possibility of designing and forming very freely shapes on workpieces, even if these are self-supporting forms. This represents a particularly advantageous development of the previously known laser deposition welding processes and offers the user a significantly broader use spectrum of this well-known technology in the production of use-specific components.

Further aspects and their advantages as well as advantages and more specific possibilities of implementing the above described aspects and features are described in the following descriptions and explanations of the attached drawings, which are in no way to be interpreted as restrictive.

Figure 1:
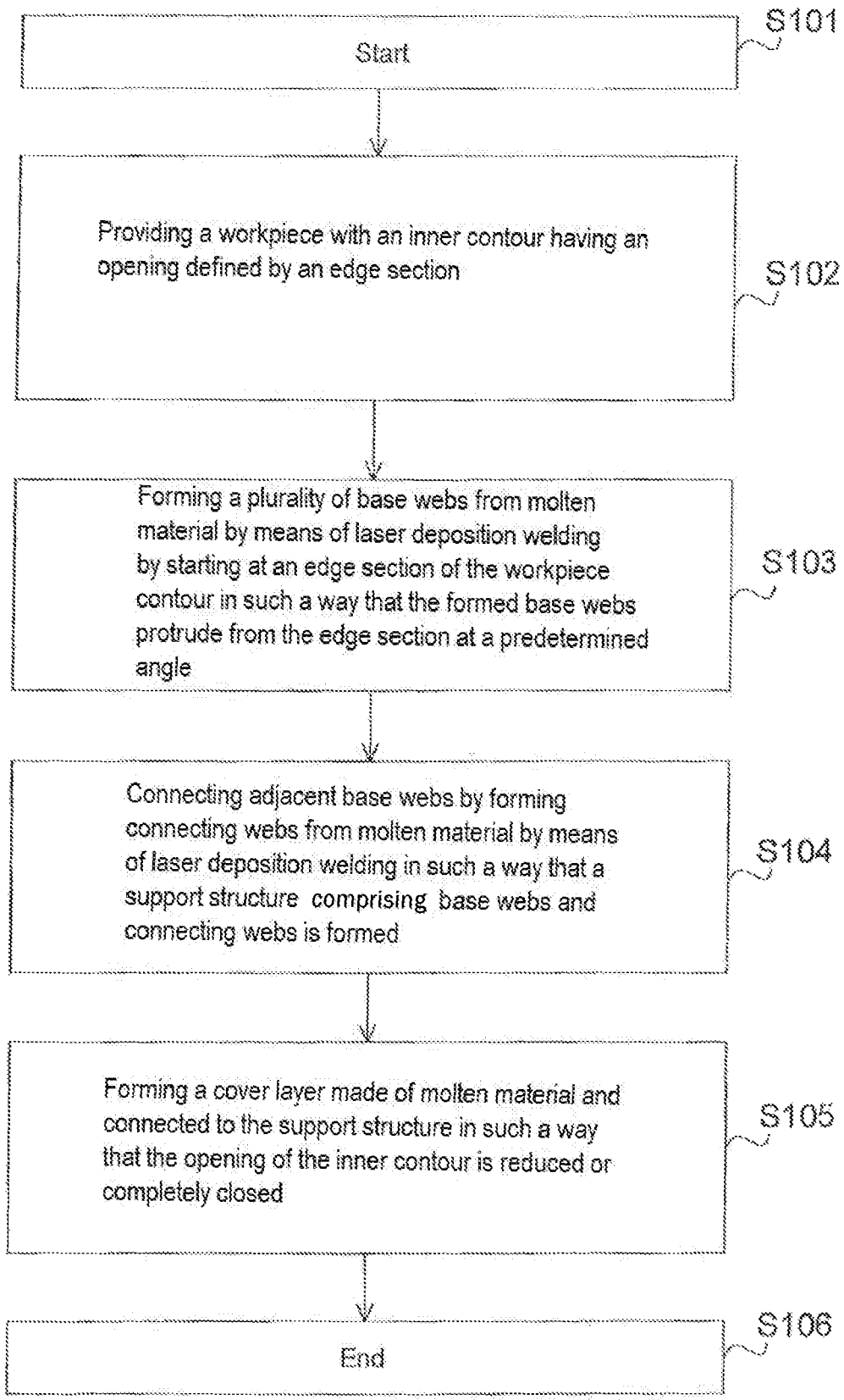
FIG. 1 shows a flow chart of the method according to the invention for reducing or completely closing an opening in an inner contour of a workpiece.

DETAILED DESCRIPTION OF THE DRAWINGS AND PREFERRED EMBODIMENTS OF THE PRESENT INVENTION

In the following, examples and embodiments of the present invention are described in detail with reference to the attached drawings. Equal or similar elements in the drawings can be marked with the same reference signs.

However, it should be noted that the present invention is in no way limited or restricted to the embodiments described below and the features thereof, but also includes modifications of the embodiments, in particular those covered by modifications of the features of the examples described or by combination of one or more of the features of the examples described within the scope of protection of the independent claims.

FIG. 1 shows a flow chart of the method according to the invention for reducing or completely closing an opening of an inner contour 2 of a workpiece, the method being described below with additional reference to FIGS. 2a and 2b.

Figure 2A:
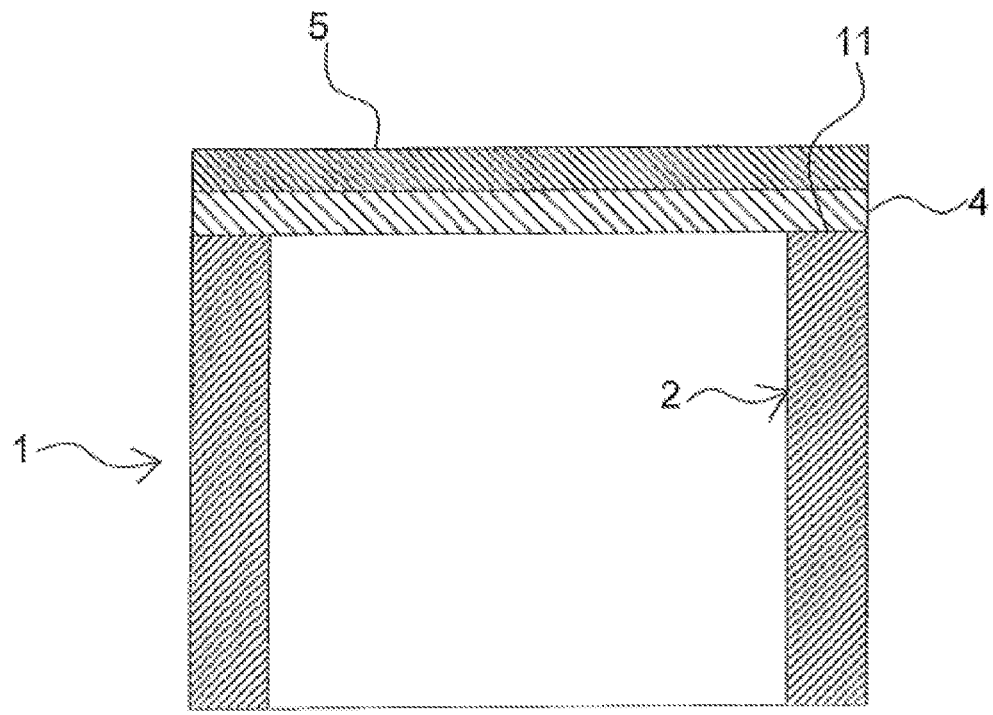
FIG. 2a shows, by way of diagram, the cross-section of a workpiece with a support structure and an additionally applied cover layer, which close an opening in the workpiece.

FIG. 2a shows, by way of diagram, the cross-section of a workpiece 1 with a formed support structure 4 and an additionally applied cover layer 5, which close an opening of the workpiece 1.

Figure 2B:
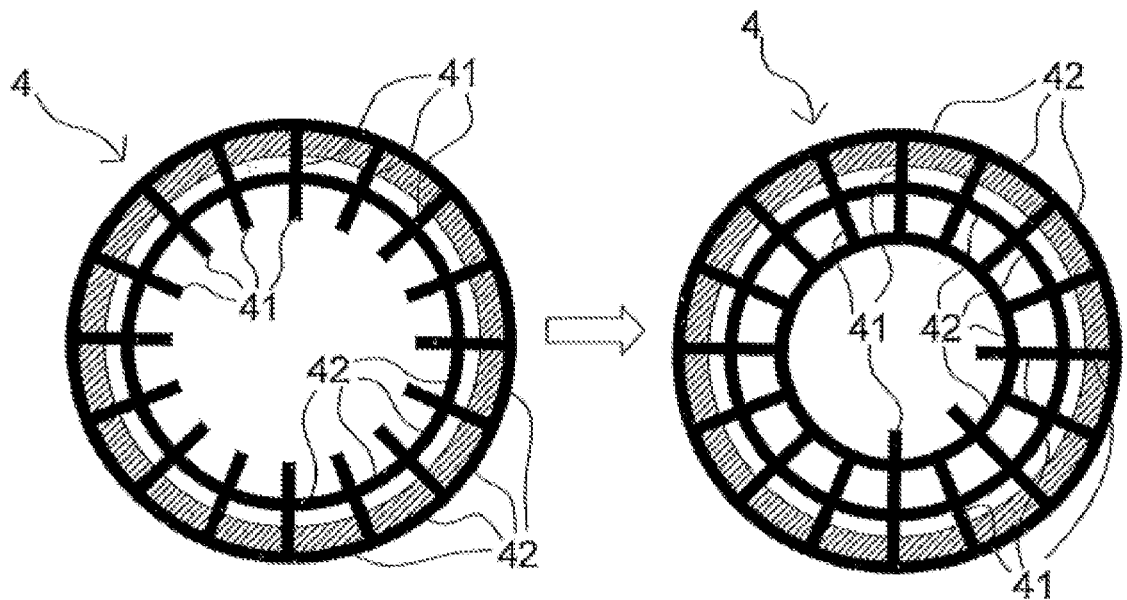
FIG. 2b shows, by way of diagram, an embodiment of the formed support structure according to the method of the invention for reducing or completely closing an opening of an inner contour of the workpiece.

FIG. 2b shows, by way of diagram, an embodiment of the formed support structure 4 according to the method of the invention for reducing or completely closing an opening in the inner contour 2 of a workpiece.

In step S102, a workpiece 1 with the inner contour 2 is provided for applying the method. In addition, the inner contour 2 has an opening which shall be reduced in size or even completely closed by the method according to the invention. The opening is also defined by an edge section 11.

In the next step S103, a plurality of base webs 41 are formed. This is done by melting material to be melted by means of a laser deposition welding device 7, in particular by feeding material to be melted by means of a material supply apparatus 8 and subsequent melting by means of a laser beam 9, and applying the material by starting at the edge section 11. The base webs 41 are here formed in such a way that they project from the edge section 11 at a predetermined angle.

The angle at which the base webs 41 project from the edge section 11 can depend on various forms of the support structure 4. For example, it can be useful to choose a roof edge shape instead of a surface for closing the opening. But the introduction and transmission of forces as well as the design of possible further material applications can also be of importance for the design of the support structure 4 and accordingly be taken into account in a modified angle of the base webs 41, as shown in FIG. 2a.

In the following step S104, the formed base webs 41, in particular the adjacent base webs 41, are connected by means of so-called connecting webs 42, which in turn are also formed by the laser deposition welding device 7. The resulting structure is extremely stable in itself due to the connection of the base webs 41 with the connecting webs 42 and can therefore be used as a grid-shaped support structure 4 for the further formation of a closure or narrowing of the opening of the inner contour 2 of a workpiece.

In the next step, S105, a cover layer 5 is formed in connection with the support structure 4 by additional molten material in such a way that the opening of the inner contour 2 of the workpiece 1 is reduced or completely closed.

Advantageously, the support structure 4 or the closure of the opening of the inner contour 2 of a workpiece can now be used to create further structures on the workpiece using the laser deposition welding process.

The workpiece 1 here has an inner contour 2, the opening of which shall be completely closed by means of the method according to the invention. For this purpose, a support structure 4 is formed using the method according to the invention, which is integrally bonded to an edge section 11 of the inner contour 2 and which completely spans the opening. This support structure 4 allows the application of a further layer, the cover layer 5, by means of which the opening of the inner contour 2 is now completely closed.

However, it is also possible to fill the free spaces of the support structure 4 with further molten material instead of the separately applied cover layer 5. For this purpose it is advantageous to provide the support structure 4, which has a grid-like structure, with a comparatively fine-meshed grid structure so that the metallic materials which are liquid at the time of application at the already existing support structure 4 are exposed e.g. to the greatest possible adhesive force, and therefore adhere to the support structure 4.

In both cases the opening can be closed or the closing of the opening can be supported by forming the support structure 4 by means of the method according to the invention.

In the illustrated support structure 4, the base webs 41 are arranged in such a way that their longitudinal directions meet substantially at an imaginary intersection point in the center of workpiece 1 (in a plan view of workpiece 1). Several connecting webs 42 are lined up (here in the illustrated example to form polygonal connecting web rows) and these connecting web rows are arranged concentrically around the imaginary intersection point of the base webs 41. The resulting exemplary structure resembles the pattern of a spider web.

FIG. 2b illustrates how the support structure 4, which can be used e.g. to close the opening of the inner contour 2 of a workpiece, is formed step by step. Material is applied to the edge section 11 of the workpiece, which defines the opening of the inner contour 2.

Starting from the edge section 11, a predetermined number of base webs 41 is now formed as an example, which are connected to form connecting webs 42 in order to give the "growing" support structure 4 more and more stability. This is particularly decisive for the base webs 41, which to date have only been integrally bonded via one end to the already existing support structure 4 or to the edge section 11.

The right-hand illustration of FIG. 2b shows an already clearly "grown" support structure 4. It could e.g. already be used for the reduction/narrowing of the opening of the inner contour 2 of a workpiece.

The support structure 4 shown in FIGS. 2a and 2b is not limited to the structure shown or described. On the contrary, differently shaped structures such as a spiderweb-like, a checkered or a honeycombed structure can be formed. However, combinations of structures can also be used if this serves the intended purpose.

Figure 2C:
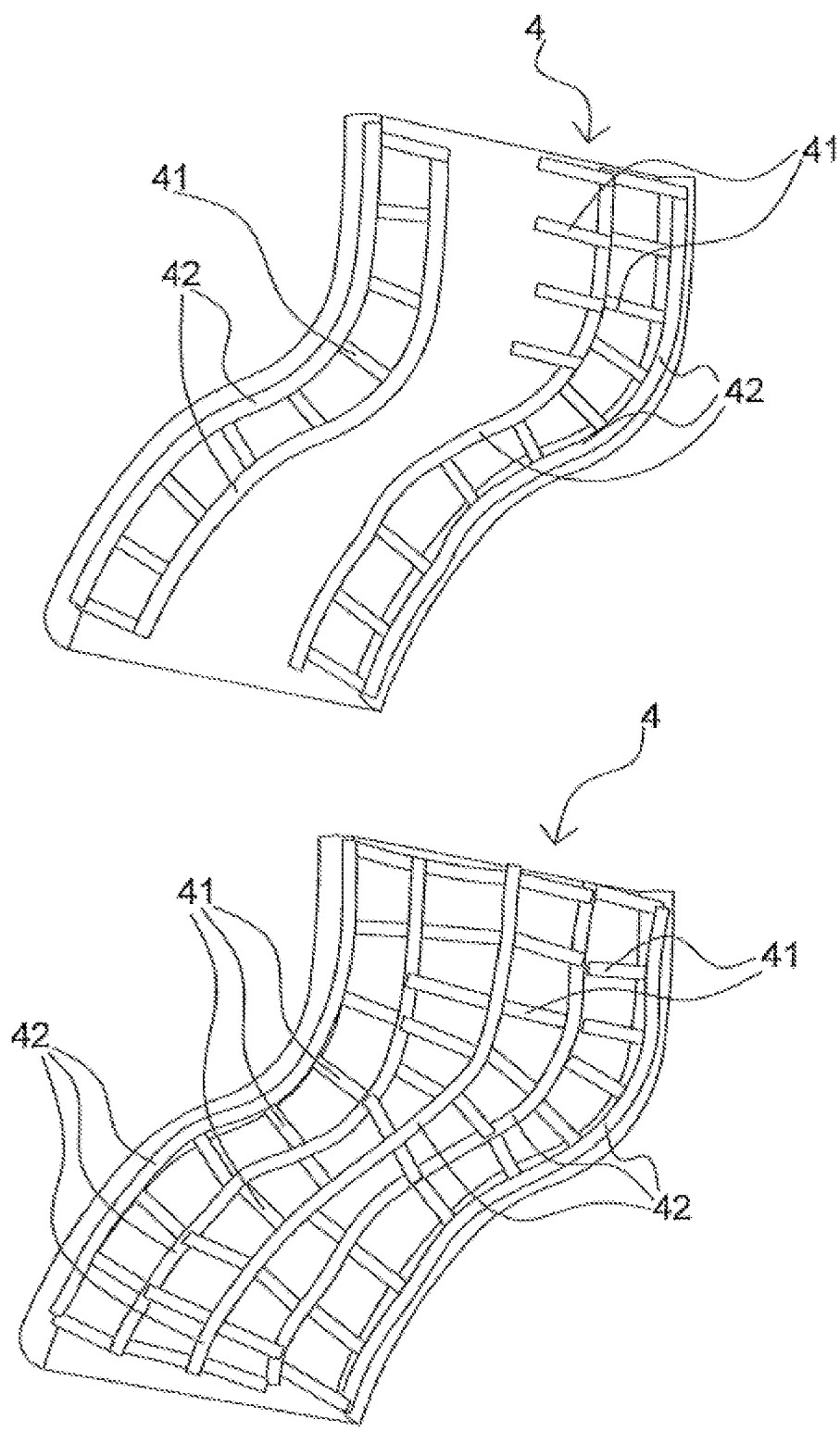
FIG. 2c shows, by way of diagram, an embodiment of the formed support structure according to the method of the invention for reducing or completely closing a trench-shaped or longitudinal opening of an inner contour of the workpiece.

FIG. 2c shows, by way of diagram, an embodiment of the formed support structure 4 according to the method of the invention for reducing (upper representation) or completely closing (lower representation) a trench-shaped or longitudinal opening of an inner contour 2 of a workpiece.

The base webs 41 are here arranged in such a way that they are formed from an edge section 11 in the width-wise direction of an e.g. trench-shaped or longitudinal opening. The connecting webs 42 are designed accordingly such that they are essentially parallel to the edge section 11 in order to form a support structure 4 that is designed in such a way that it corresponds to the course of the trench-shaped or longitudinal opening.

This support structure 4 can now either be developed into a cover layer 5 or a separate cover layer 5 is applied to it. Both can be advantageously used to reduce or completely close the trench-shaped or longitudinal opening.

Figure 3:
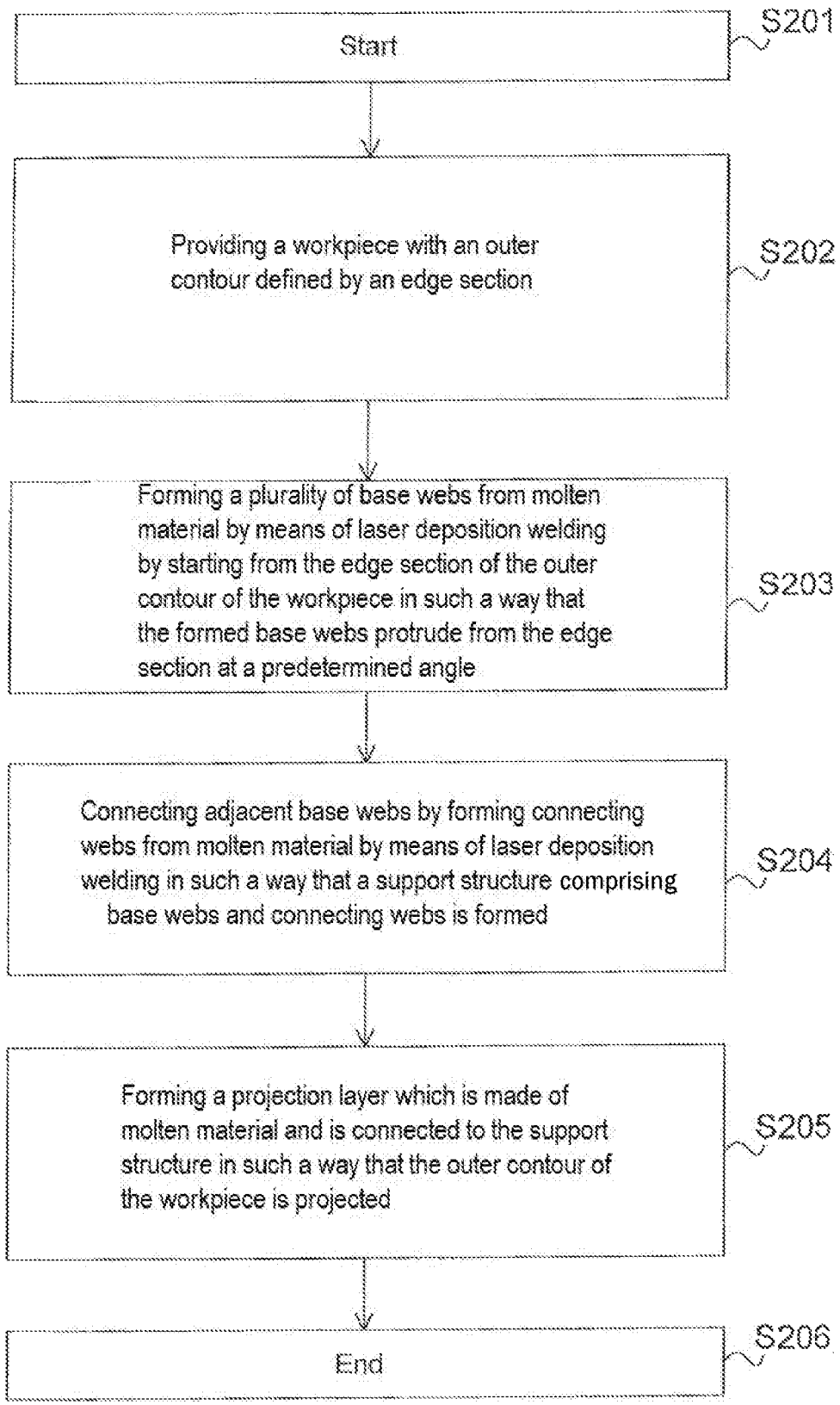
FIG. 3 shows a flow chart of the method according to the invention for projecting an outer contour of the workpiece.

FIG. 3 shows a flow chart of the method according to the invention for projecting an outer contour 3 of a workpiece, the method being described below with additional reference to FIGS. 4a and 4b.

Figure 4A:
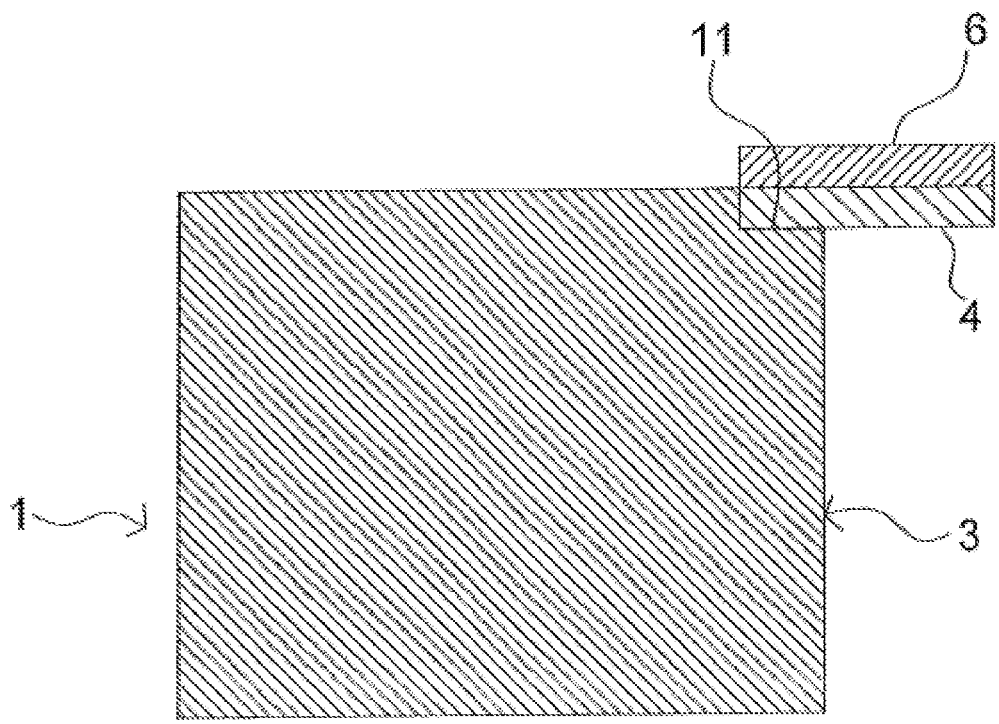
FIG. 4a shows, by way of diagram, the cross-section of a workpiece with a formed support structure and an additionally applied projection layer, which project an outer contour of the workpiece.

FIG. 4a shows, by way of diagram, the cross-section of a workpiece 1 with a formed support structure 4 and an additionally applied projection layer 6, which project an outer contour 3 of the workpiece 1.

Figure 4B:
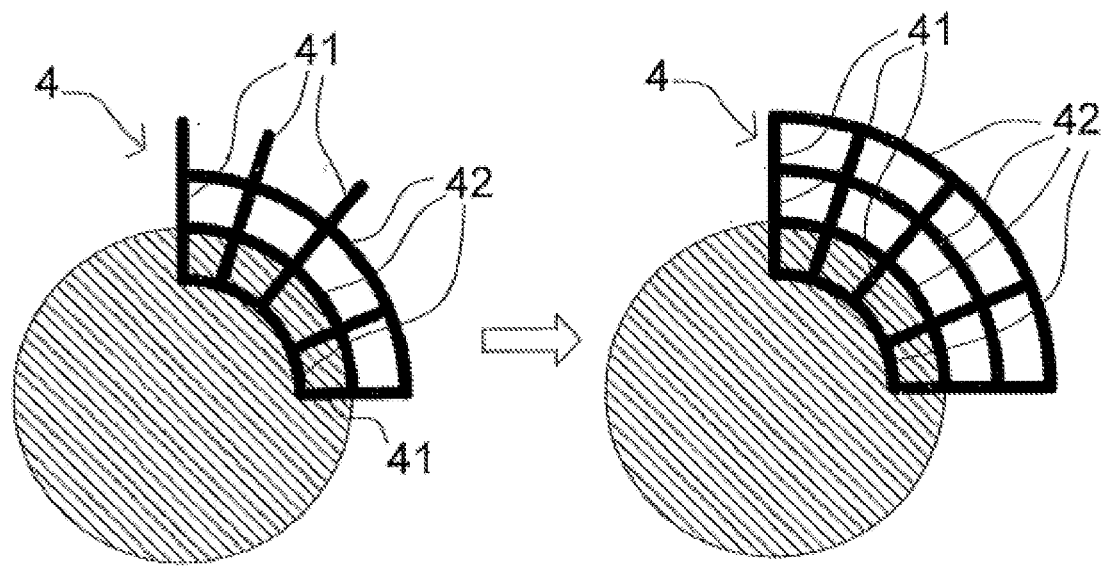
FIG. 4b shows, by way of diagram, an embodiment of the formed support structure according to the method of the invention for projecting an outer contour of a workpiece.

FIG. 4b shows, by way of diagram, an embodiment of the formed support structure 4 according to the method of the invention for projecting an outer contour 3 of the workpiece.

In step S202, a workpiece 1 with the outer contour 3 is provided for using the method. The outer contour 3 additionally has an edge section 11, from which the outer contour 3 shall be projected using the method according to the invention.

In the next step S203, a plurality of base webs 41 are formed. This is done by melting the material to be melted as already described in FIG. 1 by means of a laser deposition welding device 7 and applying it by starting at the edge section 11. The base webs 41 are here formed in such a way that they protrude from the edge section 11 at a predetermined angle.

In the following step, S204, the formed adjacent base webs 41 are connected again by means of the connecting webs 42, which in turn are also formed by the laser deposition welding device 7. Together they form the support structure 4, which, in contrast to the support structure 4 as described in FIG. 1, is not formed from the edge section 11 in the direction of an inner contour, but in the direction of the outer contour 3. The resulting structure here shows the same properties as already described in FIG. 1.

In the next step, S205, a projection layer 6 is formed in connection with the support structure 4 by additional, molten material in such a way that the outer contour 3 of the workpiece 1 is projected.

Advantageously, the support structure 4 or the projection of the outer contour 3 of a workpiece can now be used to create further structures on the workpiece by means of the laser deposition welding process.

In order to avoid unnecessary repetition of above-mentioned features, reference is here made to FIG. 2a, which describes the basic features of the formation of a support structure 4. The difference to FIG. 2a is now a projection of the outer contour 3 of workpiece 1, this projection only affecting part of the outer contour 3.

This can also be advantageous if complex, non-symmetrical component geometries have to be created to adapt the component to the respective intended purpose. However, the projection can also be symmetrical for the entire outer contour 3 of workpiece 1.

The formation of the support structure 4 by means of the method according to the invention allows the projection of the outer contour 3, in which a base is created which can either be further formed by filling the free spaces into a closed layer, or which supports the application of an additional layer (here: projection layer 6).

In the illustrated projection, the base webs 41 are arranged in a similar way as shown in FIG. 2b, so that their longitudinal directions meet essentially at an imaginary intersection point in the center of workpiece 1 (with a plan view of workpiece 1). However, the support structure 4, as described in FIG. 1, is not formed from the edge section 11 in the direction of an inner contour, but in the direction of the outer contour 3. Several connecting webs 42 are lined up and these connecting web rows are arranged concentrically around the imaginary intersection point of the base webs 41.

However, it should be clearly pointed out once again that the support structure 4 is not limited to the structure shown or described. On the contrary, structures having various shapes, such as a spiderweb-like, or checkered, or honeycombed structure, can also be formed at the projection. However, combinations of structures can also be used, if this is useful for the purpose of use, for example.

Figure 5:
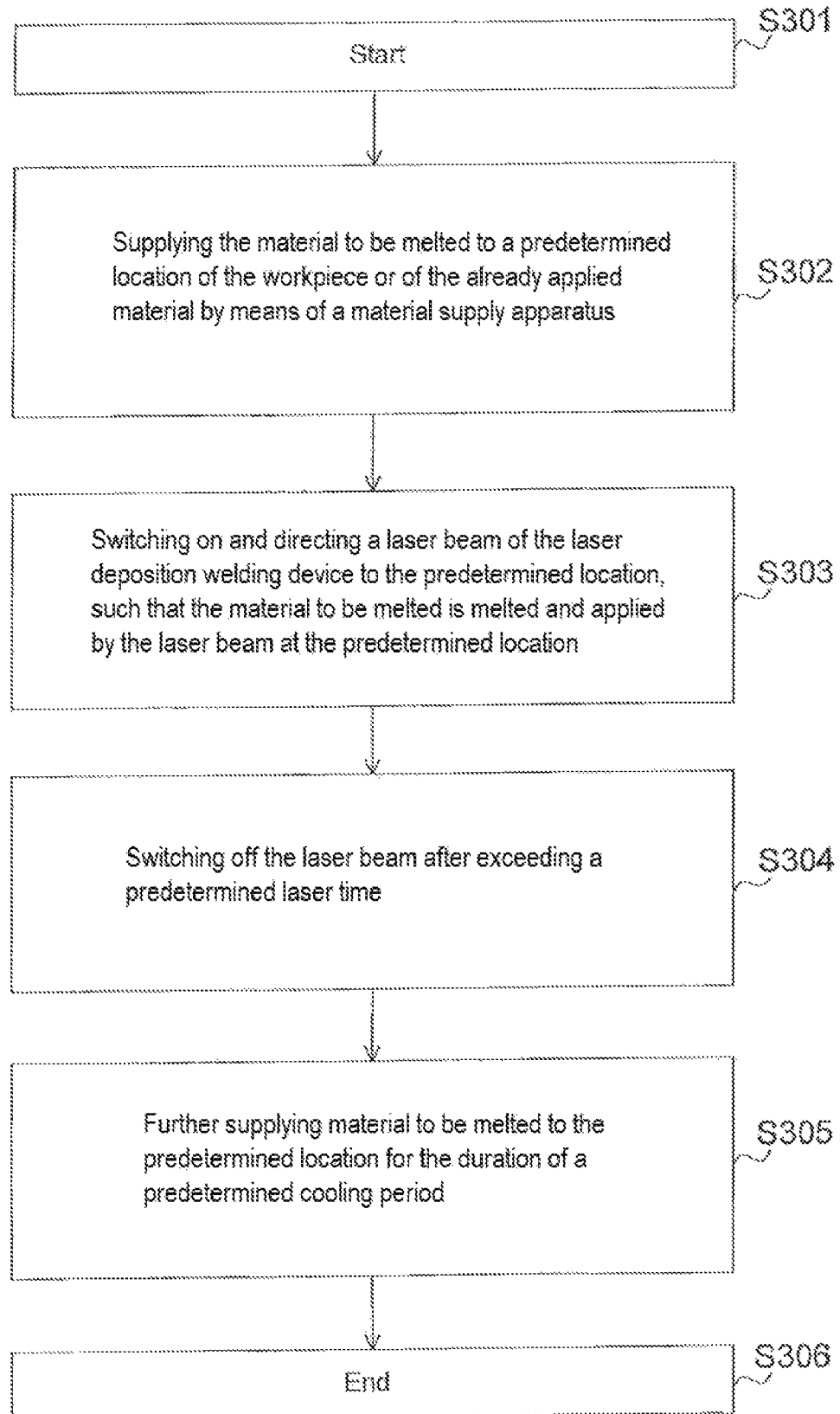
FIG. 5 shows a flow chart of a method according to the invention for the dot-wise application of molten material to form the support structure.

FIG. 5 shows a flow chart of a method according to the invention for the dot-wise application of molten material to form the support structure 4, the method being described below with additional reference to FIG. 6.

Figure 6:
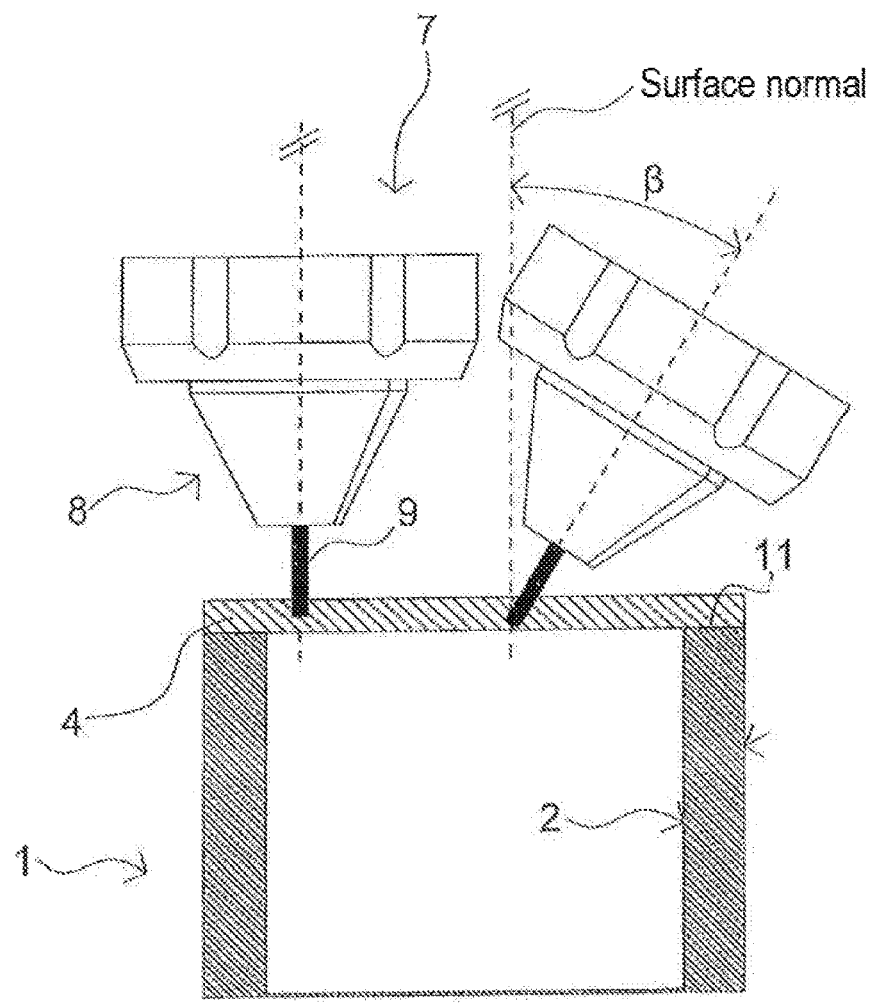
FIG. 6 shows, by way of diagram, the cross-section of a workpiece and a support structure having an angle of inclination of the support structure with respect to the edge section and a setting angle of a nozzle of a material supply apparatus and of the laser beam.
Figure 6:
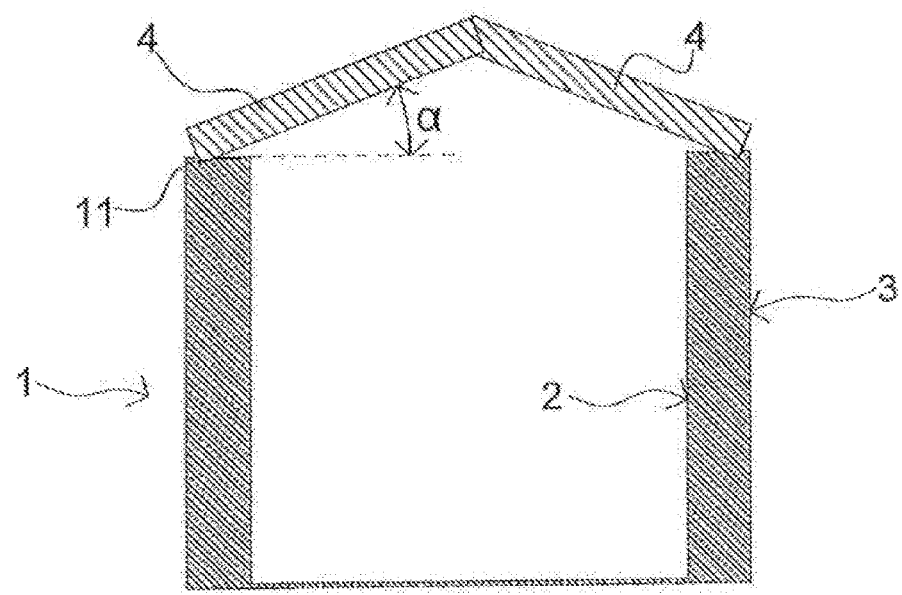

FIG. 6 shows, by way of diagram, the cross-section of a workpiece 1 and a support structure 4 with an angle of inclination a of the support structure with respect to the edge section 11 and a setting angle β of a nozzle of a material supply apparatus 8 and of the laser beam 9.

For the formation of the support structure 4 according to one of the methods of the invention, material to be melted in step S302 is supplied to a predetermined location at the edge section 11 of the workpiece 1 or at an already formed support structure 4 by means of a material supply apparatus 8.

In the following step, S303, a laser beam 9 of the laser deposition welding device 7 is switched on and directed to the predetermined location. As a result, the material (in this case metal powder) directed to the predetermined location is melted and thereby applied in a dot-like manner to the edge section 11 or to the already formed support structure 4.

In the next step, S304, the laser beam 9 is switched off again after a predetermined laser time, so that no further heat is introduced into the already molten material.

In the subsequent step, S305, material to be melted (in this case metal powder) continues to be guided to the predetermined location for a predetermined cooling time, as a result of which the liquid metal cools and solidifies comparatively quickly. The cooling of the molten material is assisted by a transport gas, which is used to transport the material to be melted to the predetermined location.

The surface of the applied material can also be influenced by the continuing supply of metal powder.

Using the method described, the base webs 41 and the connecting webs 42 can be formed into a self-supporting support structure 4. The support structure 4 thus formed can then be used advantageously for the reduction or complete closure of an opening of an inner contour 2 of a workpiece or for the projection of an outer contour 3 of a workpiece, without the need to use an auxiliary structure for supporting the support structure 4 that is being formed.

Depending on the structure to be used for the respective use case, it can be useful to set the material supply apparatus 8 and the laser beam 9 to melt the supplied material at a predetermined angle β in order to form the base webs 41 and the connecting webs 42. These angles can be smaller angles β ranging from ±0°-10°, or also larger setting angles β ranging from ±25° to ±45° or more.

In addition, special structural features of workpiece 1 or limited working space can also lead to the fact that the position of the material supply apparatus 8 and the laser beam 9 of the laser deposition welding device 7 have to be changed in relation to the structure to be formed (support structure 4). This can, for example, prevent collisions with workpiece 1 itself or with nearby boundaries of the working area.

It can also be advantageous to provide an inclination of the base webs 41 with respect to the edge region 11 in such a way that the inclination has a very small angle α of a few degrees (e.g. 3° to 7°) or a significantly larger angle α (e.g. up to 60° or 75°). This can be necessary with regard to the structural features of workpiece 1 or can be advantageous for reasons such as improved stability of the support structure 4. Here, the design of the base webs 41 with respect to the edge region 11 is not limited to positive angles α (as shown in FIG. 6), but can also have negative angles α, so that the base webs 41 are designed into a section of the inner contour 2.

Examples and embodiments of the present invention and the advantages thereof are described in detail above with reference to the attached drawings.

LIST OF REFERENCE SIGNS 1 workpiece
2 inner contour of the workpiece
3 outer contour of the workpiece
4 support structure
5 cover layer
6 projection layer
7 laser deposition welding device
8 material supply apparatus
9 laser beam
11 edge section
41 base web
42 connecting web
α angle of inclination
β setting angle

The invention claimed is:

1. A method for reducing or completely closing an opening in an inner contour of a workpiece by means of a material melted by a laser deposition welding device, comprising the following steps:
   providing a workpiece including an inner contour having an opening and further including an edge section that defines the opening,
   forming a plurality of base webs from molten material by laser deposition welding by starting on the edge section of the workpiece such that the formed base webs protrude from the edge section at a predetermined angle,
   joining adjacent base webs by forming connecting webs from molten material by means of laser deposition welding in such a way that a support structure having free spaces defined by the base webs and the connecting webs is formed, and
   forming a cover layer which is made of molten material and is connected to the support structure in such a way that at least some of the free spaces are covered or filled and the opening of the inner contour is reduced or completely closed.

2. The method according to claim 1, characterized in that the cover layer is formed by filling the free spaces of the support structure with molten material.

3. The method according to claim 1, characterized in that the cover layer is formed by applying an additional layer of molten material to the support structure.

4. A method for projecting an outer contour of a workpiece by means of a material melted by a laser deposition welding device, comprising the following steps:
   providing a workpiece with an outer contour and an edge section,
   forming a plurality of base webs from molten material by means of laser deposition welding by starting on the edge section of the workpiece such that the formed base webs protrude from the edge section at a predetermined angle,
   connecting adjacent base webs by forming connecting webs from molten material by means of laser deposition welding in such a way that a support structure having free spaces is defined by the base webs and the connecting webs is formed, and
   forming a projection layer which is made of molten material and is connected to the support structure in such a way that at least some of the free spaces are covered or filled and a portion of the outer contour of the workpiece extends outward from the remainder of the outer contour.

5. The method according to claim 4, characterized in that the projection layer is formed by filling free spaces of the support structure with molten material.

6. The method according to claim 4, characterized in that the projection layer is formed by applying an additional layer of molten material to the support structure.

7. A method for reducing or completely closing an opening in an inner contour of a workpiece by means of a material melted by a laser deposition welding device, comprising the following steps:
   providing a workpiece with an inner contour having an opening defined by an edge section,
   forming a plurality of base webs from the molten material by laser deposition welding by starting at the edge section of the inner contour of the workpiece such that the formed base webs protrude from the edge section at a predetermined angle,
   joining adjacent base webs by forming connecting webs from molten material by means of laser deposition welding in such a way that a support structure comprising base webs and connecting webs is formed, and
   forming a cover layer which is made of molten material and is connected to the support structure in such a way that the opening of the inner contour is reduced or completely closed,
   characterized in that
   the base webs and/or connecting webs of the support structure are formed by dot-wise application of molten material according to the following steps:
   supplying the material to be melted by means of a material supply apparatus to a predetermined location of the workpiece or to a predetermined location of the already applied material,
   switching on and directing a laser beam of the laser deposition welding device to the predetermined location so that the material to be melted is melted and deposited by the laser beam at the predetermined location,
   switching off the laser beam after exceeding a predetermined laser time, and
   further supplying material to be melted to the predetermined location for the duration of a predetermined cooling time.

8. The method according to claim 7, characterized in that a plurality of the base webs and a plurality of the connecting webs are arranged in such a way that the connecting webs each connect the adjacent base webs to one another and that the base webs and the connecting webs together form a grid-like structure.

9. The method according to claim 7, characterized in that the base webs and connecting webs together form a spidernet-like structure, a checkered structure or a honeycombed structure.

10. The method according to claim 7, characterized in that the laser beam has a diameter selected from the group consisting of 1 mm to 5 mm, 2 mm to 4 mm, and 2.5 mm to 3.5 mm.

11. The method according to claim 7, characterized in that the laser time is selected from the group consisting of between 0.2 and 2 seconds, between 0.5 and 1.5 seconds, and 1 second.

12. The method according to claim 7, characterized in that in the formation of base webs and/or connecting webs of the support structure, the material supply device and the laser beam are each displaced by a distance selected from the group consisting of 0.5 mm to 1.8 mm, 0.8 mm to 1.5 mm, and 1 mm to 1.2 mm, to the other predetermined location of the applied material after a dot-wise application of molten material at the predetermined location in order to apply further material for the respective base web and/or connecting web of the support structure.

13. The method according to claim 7, characterized in that the cooling time is selected from the group consisting of between 1 and 10 seconds, between 3 and 8 seconds, and between 4 and 6 seconds.

14. The method according to claim 7, characterized in that the material supply apparatus is adapted to direct the material to be melted via a nozzle to the predetermined locations in a focusing way.

15. A method for projecting an outer contour of a workpiece by means of a material melted by a laser deposition welding device, comprising the following steps:

providing a workpiece with an outer contour defined by an edge section, forming a plurality of base webs from molten material by means of laser deposition welding by starting at the edge section of the outer contour of the workpiece such that the formed base webs protrude from the edge section at a predetermined angle, connecting adjacent base webs by forming connecting webs from molten material by means of laser deposition welding in such a way that a support structure comprising base webs and connecting webs is formed, and forming a projection layer which is made of molten material and is connected to the support structure in such a way that the outer contour of the workpiece is projected, characterized in that the base webs and/or connecting webs of the support structure are formed by dot-wise application of molten material according to the following steps:

supplying the material to be melted by means of a material supply apparatus to a predetermined location of the workpiece or to a predetermined location of the already applied material, switching on and directing a laser beam of the laser deposition welding device to the predetermined location so that the material to be melted is melted and deposited by the laser beam at the predetermined location, switching off the laser beam after exceeding a predetermined laser time, and further supplying material to be melted to the predetermined location for the duration of a predetermined cooling time.

16. The method according to claim 15, characterized in that
a plurality of the base webs and a plurality of the connecting webs are arranged in such a way that the connecting webs each connect the adjacent base webs to one another and that the base webs and the connecting webs together form a grid-like structure.

17. The method according to claim 15, characterized in that
the base webs and connecting webs together form a spidernet-like structure, a checkered structure or a honeycombed structure.

18. The method according to claim 15, characterized in that
the laser beam has a diameter selected from the group consisting of 1 mm to 5 mm, 2 mm to 4 mm, and 2.5 mm to 3.5 mm.

19. The method according to claim 15, characterized in that
the laser time is selected from the group consisting of between 0.2 and 2 seconds, between 0.5 and 1.5 seconds, and 1 second.

20. The method according to claim 15, characterized in that
in the formation of base webs and/or connecting webs of the support structure, the material supply device and the laser beam are each displaced by a distance selected from the group consisting of 0.5 mm to 1.8 mm, 0.8 mm to 1.5 mm, and 1 mm to 1.2 mm, to the other predetermined location of the applied material after a dot-wise application of molten material at the predetermined location in order to apply further material for the respective base web and/or connecting web of the support structure.

21. The method according to claim 15, characterized in that
the cooling time is selected from the group consisting of between 1 and 10 seconds, between 3 and 8 seconds, and between 4 and 6 seconds.

22. The method according to claim 15, characterized in that
the material supply apparatus is adapted to direct the material to be melted via a nozzle to the predetermined locations in a focusing way.

* * * * *